United States Patent [19]

Dickinson

[11] Patent Number: 4,698,915

[45] Date of Patent: Oct. 13, 1987

[54] METHOD AND APPARATUS FOR CONDENSATION HEATING

[75] Inventor: David A. Dickinson, Hopewell Township, N.J.

[73] Assignee: American Telephone and Telegraph Company, N.Y.

[21] Appl. No.: 892,608

[22] Filed: Aug. 4, 1986

[51] Int. Cl.$^4$ ............................................. F26B 3/04
[52] U.S. Cl. .......................................... 34/23; 34/32; 34/78; 134/11; 134/31
[58] Field of Search .................... 34/78, 36, 23, 27, 68, 34/32; 134/11, 31; 432/194, 197

[56] References Cited

U.S. PATENT DOCUMENTS

| | | | |
|---|---|---|---|
| 3,866,307 | 2/1975 | Pfahl, Jr. et al. .................. | 29/498 |
| 4,321,031 | 3/1982 | Woodgate ............................. | 432/11 |
| 4,389,797 | 6/1983 | Spigarelli et al. .................. | 34/73 |
| 4,628,616 | 12/1986 | Shirai et al. ....................... | 34/78 |

Primary Examiner—Larry I. Schwartz
Attorney, Agent, or Firm—D. J. Kirk; Roderick B. Anderson

[57] ABSTRACT

A technique for condensation soldering of articles (29) in a facility (40 or 80) having a vapor chamber (42) and a pair of aligned input (102) and exit (104) throats. An article (29) to be soldered is transported sequentially through the input channel (56), the vapor chamber (42) and the output channel (58). Simultaneously, air is moved, in a controlled manner, into and through a portion of the exit channel, in a direction opposite to the movement of the article and withdrawn from the input channel. The air exiting the input channel is processed to recover the expensive vapor entrained therein.

1 Claim, 6 Drawing Figures

METHOD AND APPARATUS FOR CONDENSATION HEATING

TECHNICAL FIELD

The invention is directed to a technique for heating articles by condensing hot saturated vapor thereon in an in-line condensation heating facility. In particular, methods and apparatus are provided to prevent loss of the vapor during the condensation heating process.

BACKGROUND OF THE INVENTION

Condensation soldering is a process wherein the vapor of a high temperature boiling point liquid is allowed to contact the objects or components to be soldered. The latent heat of evaporation given up when the vapor condenses on the object quickly raises its temperature and causes any solder, tin, alloy or tin-lead electroplate or other similar material thereon to melt and flow. It is particularly desirable to accomplish this end with minimal loss of the relatively expensive heat transfer vapor from the facility. In addition, escape of other vapors, such as those produced during the soldering process, should be kept to a minimum from an environmental standpoint.

Although the background of the present invention is most readily understood in the context of soldering, its application is not to be construed as limited to soldering. Many processes, such as curing, cooking, fusing and brazing, as well as soldering, require that articles be rapidly heated to elevated temperatures. Additionally, other types of processes besides heating processes also require that a vapor be contained within a tank or vessel as a conveyor moves therethrough (such as defluxers, degreasers or the like).

Several methods and apparatus have been disclosed in the prior art for effecting solder reflow operations on printed circuits through the use of hot saturated vapors. One such facility is disclosed in R. C. Pfahl, Jr. et al., U.S. Pat. No. 3,866,307, issued Feb. 18, 1975 and is incorporated by reference herein. Circuit boards are loaded onto a conveyor and moved downward into a chamber containing hot saturated vapor of a high boiling point heat transfer fluid such as a fluorinated hydrocarbon. As the circuit boards pass through the vapor they are heated to a suitable temperature for soldering. The circuit boards then travel upward and out of the chamber where the solder cools and solidifies to form a bond. Such a technique has proved most effective for soldering, fusing and the brazing of articles.

Additional "in-line" type systems have been developed such as those shown in U.S. Pat. Nos. 4,321,031 to R. W. Woodgate and 4,389,797 to D. J. Spigarelli et al. Each patent describes an in-line condensation soldering system having a centrally located heating chamber containing hot saturated vapor. Both systems have an input and exit throat which laterally communicate with the heating chamber. In operation, one or more conveyors carry articles to be soldered through the input throat, into the heating chamber to reflow the solder on the articles and along the exit throat where the articles may be offloaded.

An additional commercially available system also has a heating chamber with input and exit throats but the heating zone is in the lower portion of the heating chamber. This requires the conveyor to bring the articles to be soldered down, into the vapor heating zone to reflow the solder, then up and into the exit throat. All of the described systems have cooling surfaces proximate to the input and output throats to condense heat transfer vapor to define the heating zone. The condensed vapor can then be directed back to a sump for revaporization within the heating chamber.

Air is drawn from the throat ends to provide ventilation of these areas for operator safety. Vapor escaping from the open throat ends tends to be entrained in this flow and will be prevented from entering the shop environment. In some facilities the flow is processed to remove as much of the heat transfer fluid component therefrom as possible before being passed to exhaust.

One technique used in the above-described apparatus for lessening loss of the expensive vapor is to minimize the disturbance of air/vapor in the interior portions of the faciliites by limiting air motion to the extreme ends of the throats or external areas close to the throat ends. Thus, disturbance of the vapor zone within the facility is kept to a minimum, which lessens the tendency for vapor to move to the throat ends and be lost to the atmosphere, either through the exhaust system or to the shop environment.

This approach has been found to be ineffective since convection of vapor to the open throat areas, in particular at the exit end, is increased by the motion of the conveyor and the parts thereon. Diffusion of the vapor, although very slow, will occur even without convective motion. With air movement limited to the extreme ends of the throats, the flow is difficult to control or contain. Thus, loss of vapor, particularly that evaporating from the surface of the article, can occur to the outside atmosphere, even when the system is designed to draw outside air for ventilation. Recovery of vapor entering the ventilation system is extremely difficult due to the relatively large flow rate and small concentration of vapor.

SUMMARY OF THE INVENTION

The foregoing problems have been overcome by the instant technique of heating articles in a condensation heating facility having a processing vapor chamber with input and output throats communicating therewith. An article to be heated is transported sequentially through the input throat, the vapor chamber and the output throat; while simultaneously moving gas through the facility, in a controlled manner, to counteract the normally present convection and diffusion of the vapors. Gas motion in the exit throat is substantially in a direction opposite to the movement of the article. The gas is processed to recover the vapor entrained therein.

Advantageously such a technique substantially eliminates loss of expensive vapor of the heat transfer fluid used in the process.

DETAILED DESCRIPTION

The instant invention is described as it relates to condensation soldering. However, such description is for purposes of exposition and not for limitation, for the instant technique can be used in in-line condensation heating facilities to fuse or braze articles as well as in vapor degreasers and apparatus for heating and curing of foods or the like.

Figure 1:
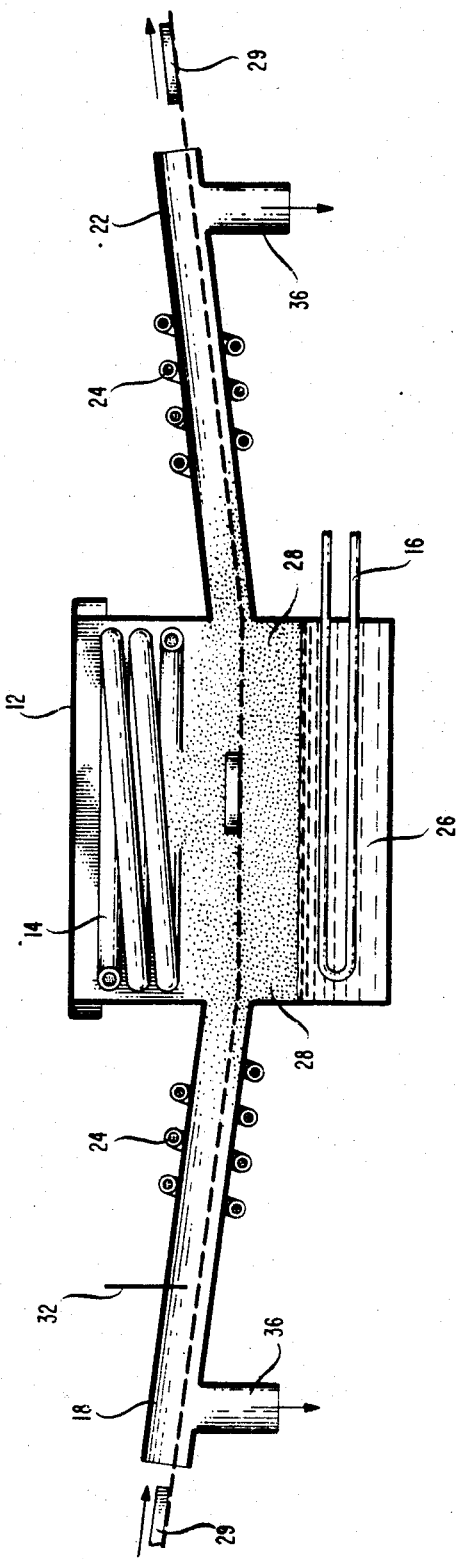
FIGS. 1 and 2 are schematic drawings of known in-line condensation soldering facilities.
Figure 2:
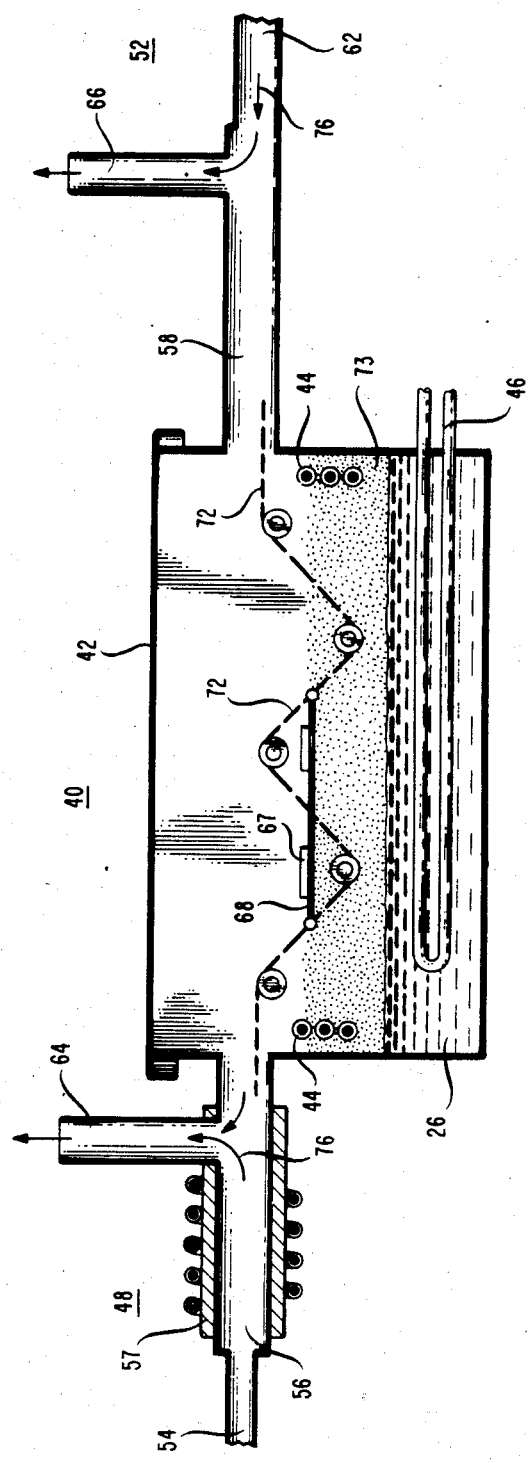

In-line condensation soldering facilities are typified by the configurations depicted in FIGS. 1 and 2. In FIG. 1 the facility 10 is comprised of a chamber 12 having condensing coils 14 in the upper portion and an immersion heater 16 in the lower portion thereof. Inclined inlet and exit throats 18 and 22, respectively, communicate with and extend laterally from the chamber 12. Vapor cooling coils 24 surround the inlet and exit throats 18 and 22 to condense vapor 28 entering the throats to prevent loss thereof to the atmosphere. The condensed fluid will flow back into the chamber 12 along the inclined throats 18 and 22.

In operation, a relatively expensive heat transfer fluid 26, such as Flourinert FC 70, manufactured by the 3M Company, located in the lower portion of the chamber 12 is brought to its boiling point (e.g., 419° F.) by activating the immersion heater 16. Vapor 28 from the boiling fluid 26 is substantially confined within the chamber 12 by the cooling coils 14 and 24. An article 29 having predeposited solder thereon, in the form of solder preforms (not shown) or the like, is placed on a conveyor 32 and moved through the inlet throat 18 and into the chamber 12 where the hot saturated vapor 28 condenses on the article to reflow the solder. The article 28 continues to move through the exit throat 22 where the soldered article is offloaded.

In such a system the vapor in the chamber 12 forms a barrier in the throats 18 and 22, to the movement of air through the facility. For operator safety, a ventilation system is used that pulls air through openings 36 in the ends of the throats 18 and 22 and directly to exhaust. In some facilities 10 exhausted air is first passed through a cooling and/or filter system (not shown) to recover primary vapor or aerosol that may be entrained in the air flow. The air flow velocity is kept as low as possible to minimize the disturbance of the vapor zone which would cause movement of vapor into the inlet and exit throats 18 and 22, respectively. Also, evaporation of condensed heat transfer fluid 26 from the surface of the article 28 will occur in the exit throat 22. It has been observed that water vapor can build up in the stagnant air zones in the throats 18 and 22, as well as in the space above the vapor, within the chamber 12. Such water buildup can cause vapor loss and also cause extreme problems with the soldering process itself. The water can also contribute to corrosion.

FIG. 2 is a schematic drawing of another type of facility 40 designed to maintain horizontal orientation of the product to be soldered. The facility 40 is comprised of a chamber 42 having condensing coils 44 in the central portion thereof and an immersion heater 46 in the lower portion thereof. Inlet and exit throats 48 and 52, respectively, communicate with and extend horizontally from the chamber 42. The inlet throat 48 has a product load section 54 and a tunnel 56 with a heating unit 57 mounted thereabout while the exit throat 52 has a cool down tunnel 58 and a product offload section 62. First and second recovery vents 64 and 66 are located on the tunnels 56 and 58, respectively.

In operation, articles 67 to be soldered are placed on a pallet 68 at the load station 54. The pallet 68 moves by means of a conveyor 72 (not shown at inlet and exit) which moves into the tunnel 56 where the articles 67 with previously deposited solder thereon are preheated by the heating unit 57. The pallet 68 is then conveyed into the hot saturated vapor 73 which is located below the input and exit throats 48 and 52. Once the solder has been reflowed, the pallet 68, with the articles 67 thereon, moves through the tunnel 58 where the solder is cooled and solidified to form the bond, and the articles offloaded at section 62.

By locating the hot saturated vapor 73 below the level of the input and exit throats 48 and 52, a free air space, without the barrier of vapor, is provided in a substantially straight path along the throats 48 and 52 and above the vapor 73. Air is drawn through first and second vents 64 and 66 into a cooling/filter system for vapor recovery (not shown). The motion of the air/vapor is indicated by the arrows 76. The system is designed to minimize disturbance of the air inside the chamber 42 to lessen the loss of the expensive vapor 73. The basic difference from the facility 10 shown in FIG. 1 is that the vapor 73 does not form a barrier to the movement of air through the facility. As with the facility 10, the facility 40 also permits some of the vapor 73 to be drawn out of the exit throat 52 with the pallet 68.

Figure 3:
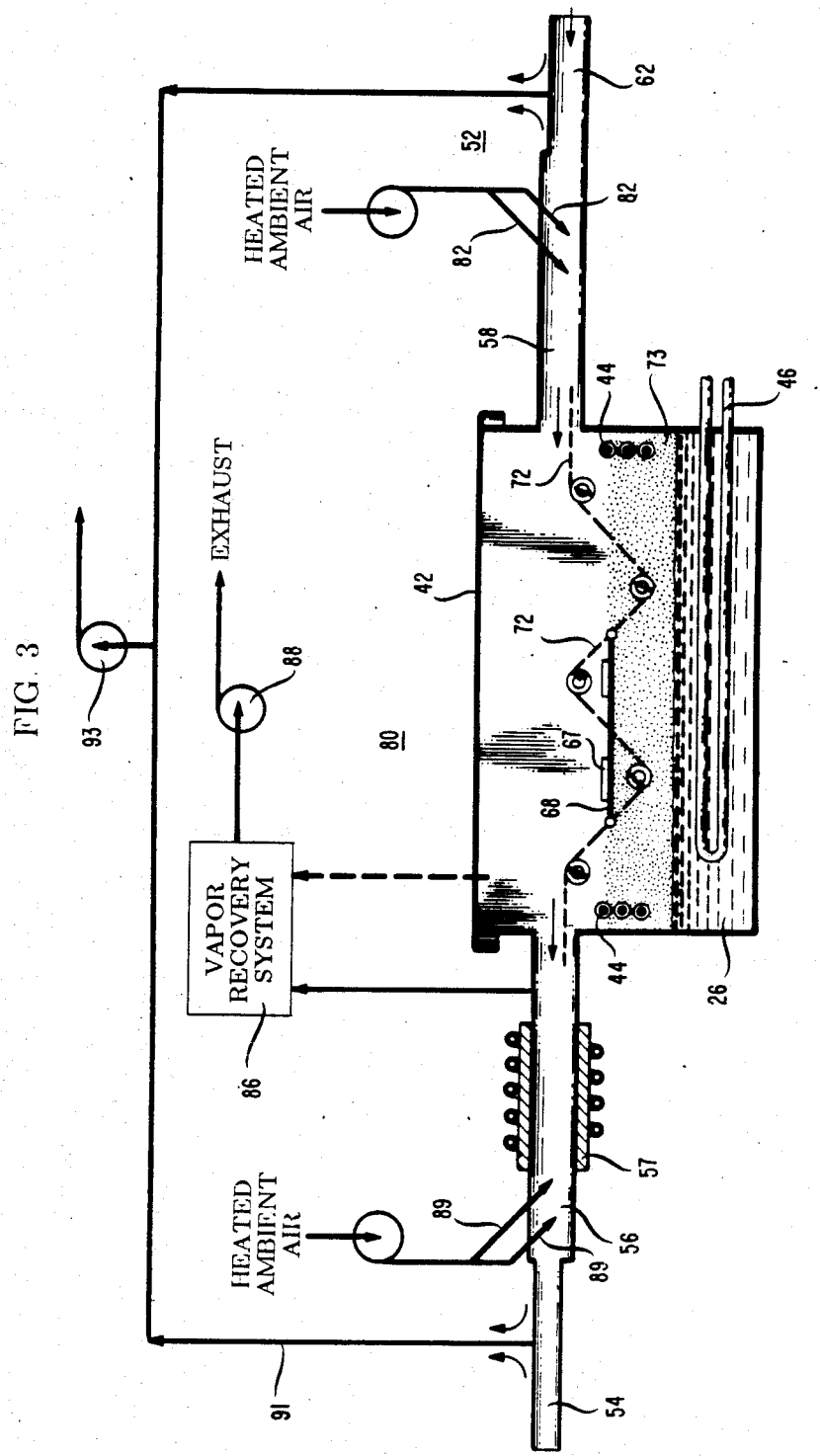
FIG. 3 is a schematic drawing of an exemplary embodiment of the instant invention using a single gas pass technique.

The instant invention, embodied schematically in FIG. 3, overcomes the foregoing problems. The facility 80 of FIG. 3 is comprised of an apparatus similar to the facility 40 of FIG. 2 and like elements are labelled with the same number. Ambient gas (e.g., air, argon, nitrogen or the like) is drawn in by the fan 88 or is injected through jets 82 into the cool down tunnel 58 and passes through the chamber 42. The air, with entrained vapor 73 therein, is then drawn through a vapor recovery system 86 via line 87 or directly from the upper portion of chamber 42 (see dashed line). The liquid recovered may be directed back to the sump of the chamber 42 and the air exhausted to the atmosphere by the fan 88. Additionally, ambient air may also be drawn or directed into the throat 48, passing therethrough, and drawn into the vapor recovery system 86 with vapor entrained therein. The air may then be drawn from the recovery system 86 by the fan 88 and exhausted to the atmosphere. The ambient air may be heated before entering the facility to aid entrainment of vapor and evaporation of liquid from the surface of articles 67.

Accordingly, rather than attempting to minimize the disturbance of the air/vapor within the facility 80, air motion (i.e., disturbance) is introduced in a controlled manner via positive (e.g., fan-or jet-induced) flow to directly counteract effects of the normally present convection and diffusion. This includes convection induced by the movement of the conveyor 72 and assures the recovery of fluid from the surface of the articles 67 before they exit the facility 80. The motion of air through the facility 80 also eliminates stagnant zones which prevents the accumulation of water. If the recovery system 86 recovers both water and heat transfer fluid from the airstream, the water should be separated (e.g., by gravity) and not be returned with the fluid to the facility 80. The amount of vapor 73 contained in the air flow will be substantial since vapor is continually entrained in the air flow from the interior of the machine.

Additionally, to provide ventilation for safety of the operator, exhaust lines 91 and 92 are located at sections 54 and 62, respectively, and function separately from the previously-described air flow system. Air is drawn into the exhaust lines 91 and 92 by the fan 93 and passed to exhaust.

Figure 4:
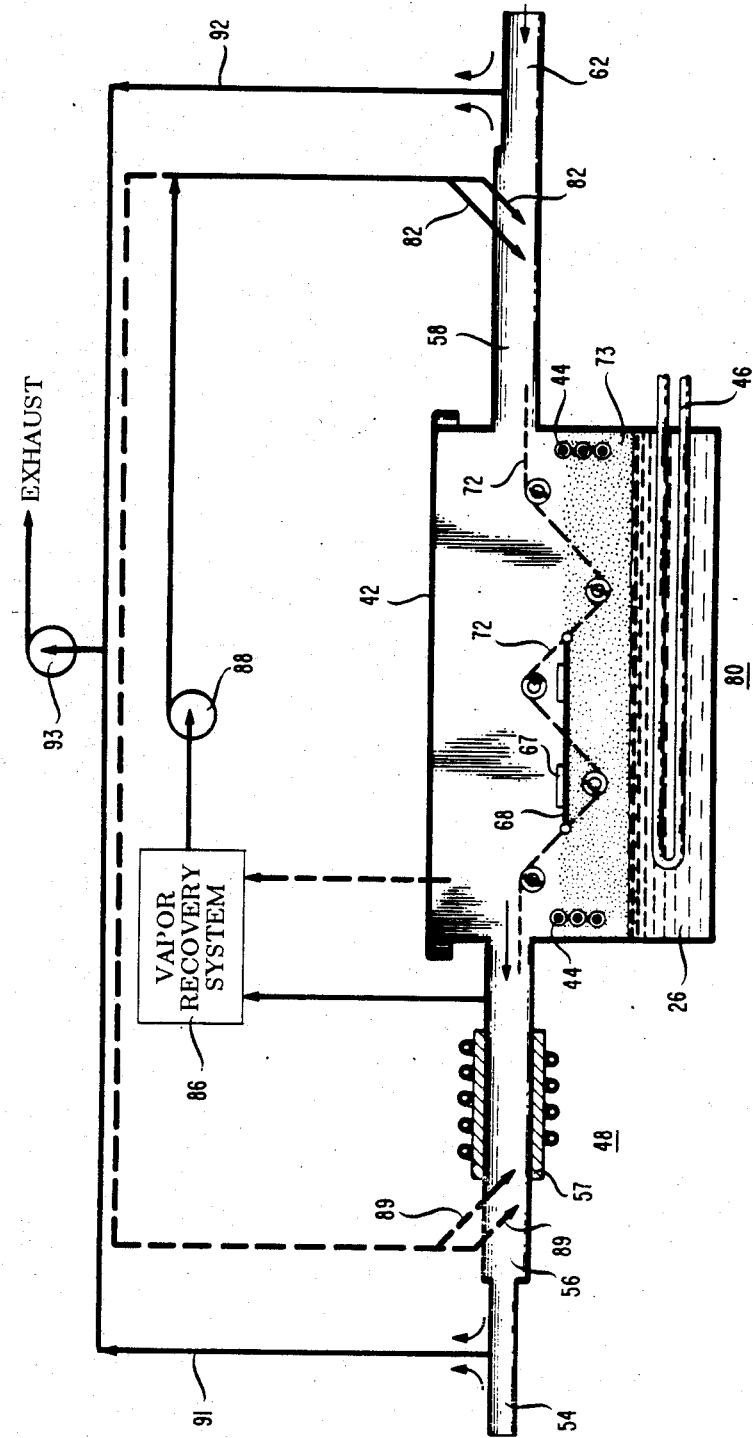
FIG. 4 is a schematic drawing of an exemplary embodiment of the instant invention using a closed loop circulation system.

The single pass system directly to the exhaust, depicted in FIG. 3, is ideal because of its relative simplicity. However, recovery of the vapor 73 from the air stream must be very efficient and should be monitored for proper operation to prevent loss of large quantities of vapor to the atmosphere. To overcome this limitation, a closed loop embodiment shown in FIG. 4 has been developed. FIG. 4 is essentially the same as FIG. 3 but has been modified in that the air drawn through the fan 88 is recirculated back into the facility 80 via the jets 82 thus forming a closed loop.

Additional recirculation may be provided to the inlet throat 48 from the jets 89 via conduit 90 (shown as a dashed line). Re-injected air may also be reheated. With the closed loop arrangement the recovery system should allow for recovery of water along with heat transfer fluid from the airstream so that it does not accumulate in the recirculated air. As with the single pass system, it should not be returned to the facility with the recovered heat transfer fluid.

Figure 5:
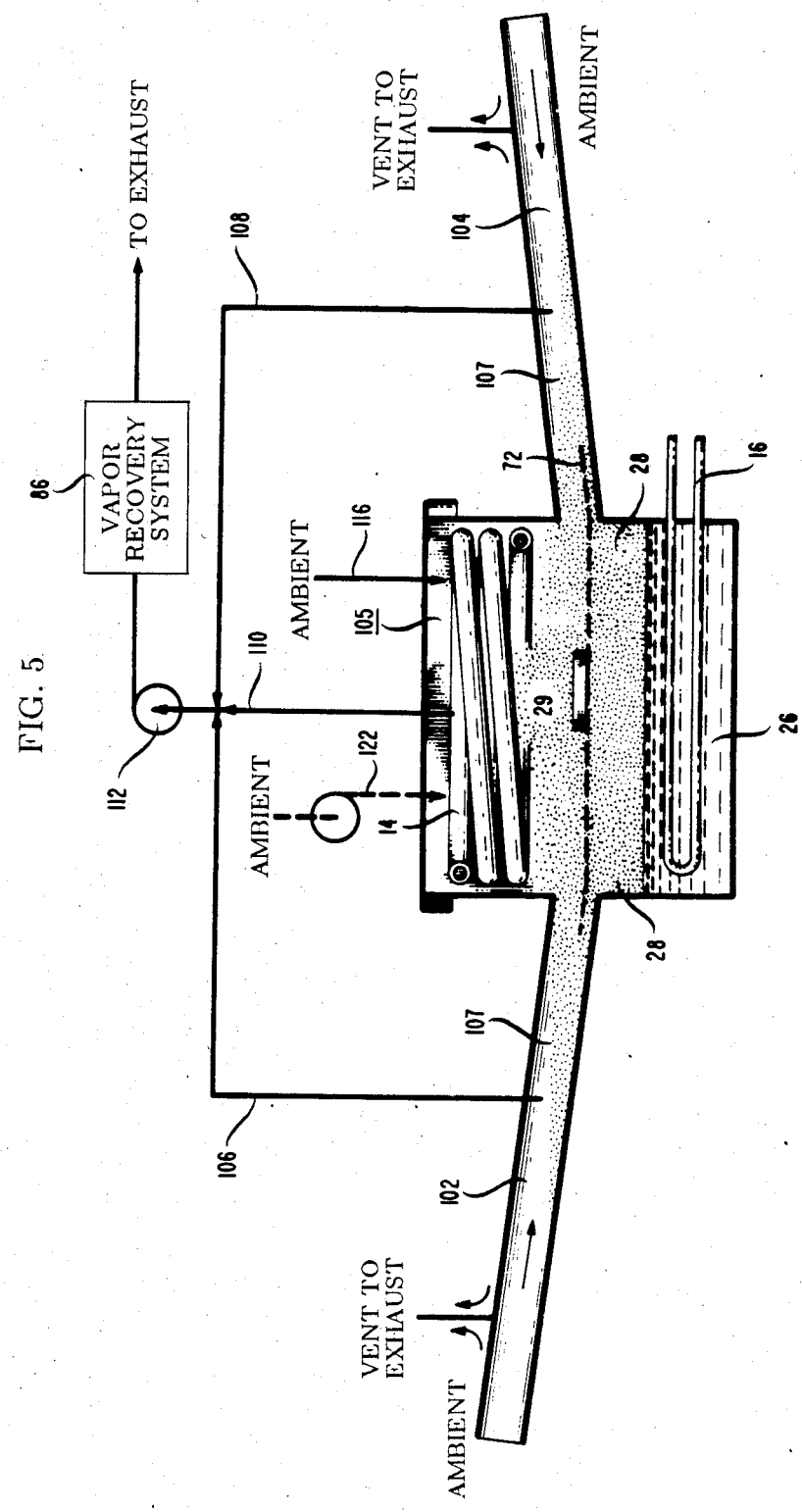
FIGS. 5 and 6 are schematic drawings of additional embodiments of closed and open gas loop versions of the instant invention.
Figure 6:
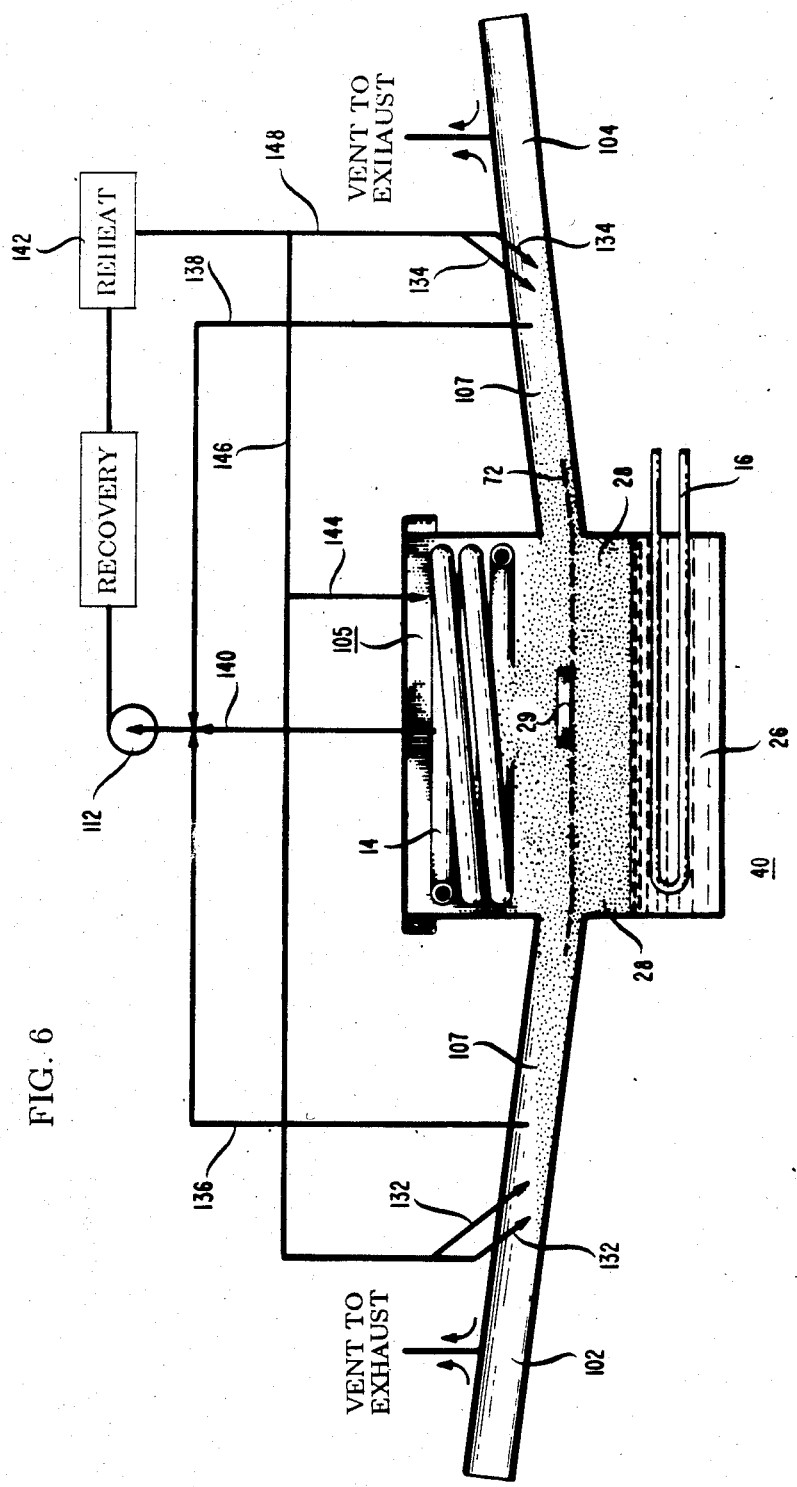

If the above-described systems are applied to the type of facility shown in FIG. 1, air flow must occur through each individual zone, as shown in FIG. 5 (single pass) and FIG. 6 (closed loop) because of the barrier formed by the vapor.

In FIG. 5 gas, such as air, is withdrawn from the inclined throats 102 and 104 as well as the volume 105 above the vapor/air interface 107 in the facility 40 by exhaust lines 106, 108 and 110, respectively, by the fan 112. The fan 112 directs the air, with the vapors entrained therein, to the vapor recovery system 86 which exhausts the air to the atmosphere. Ambient air may be drawn into the volume 105 via a supply line 116 or blown in by a fan 118 through a line 122. For the sake of clarity, cooling coils and air jets are not shown in the input and output throats.

The closed loop system version of FIG. 5 is shown in FIG. 6 where gas is directed into the throats 102 and 104 via jets 132 and 134, respectively. The gas, with entrained vapor therein, is withdrawn from the throats 102 and 104, proximate to the vapor interface 107. The gas passes through lines 136 and 138 and joins line 140 which draws the gas-vapor mixture from the volume 105 above the vapor in the facility 40. The gas-vapor mixture in lines 36, 138 and 140 is drawn through fan 112 and is directed through the vapor recovery system 86 and reheat apparatus 142 where the gas is directed back into the jets 132, 134 and facility input 144 via lines 146 and 148.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A method of processing an article in a condensation heating facility having a processing vapor chamber with input and output throats communicating therewith, comprising the steps of:

transporting the article, upon which hot saturated vapor is to be condensed, sequentially through the input throat, the vapor chamber and the output throat;

heating air from the ambience external to the vapor chamber;

directing the heated air into the input throat and output throat at an acute angle with respect to the major axes of such throats and in the direction of the vapor chamber;

removing heated air and vapor from the heating facility at a location between the locations at which heated air is injected into the input and output throats, condensing to liquid any vapor contained in such removed heated air, and returning such condensed liquid to the vapor chamber; and forcibly removing and exhausting air from the input and output throats at locations which are further from the vapor chamber than the locations at which heated air is injected into the input and output throats.

* * * * *